March 26, 1946.   C. DREXLER ET AL   2,397,092
POWER CONTROL FOR ARTICULATED BEDS
Filed Aug. 7, 1942   9 Sheets-Sheet 2
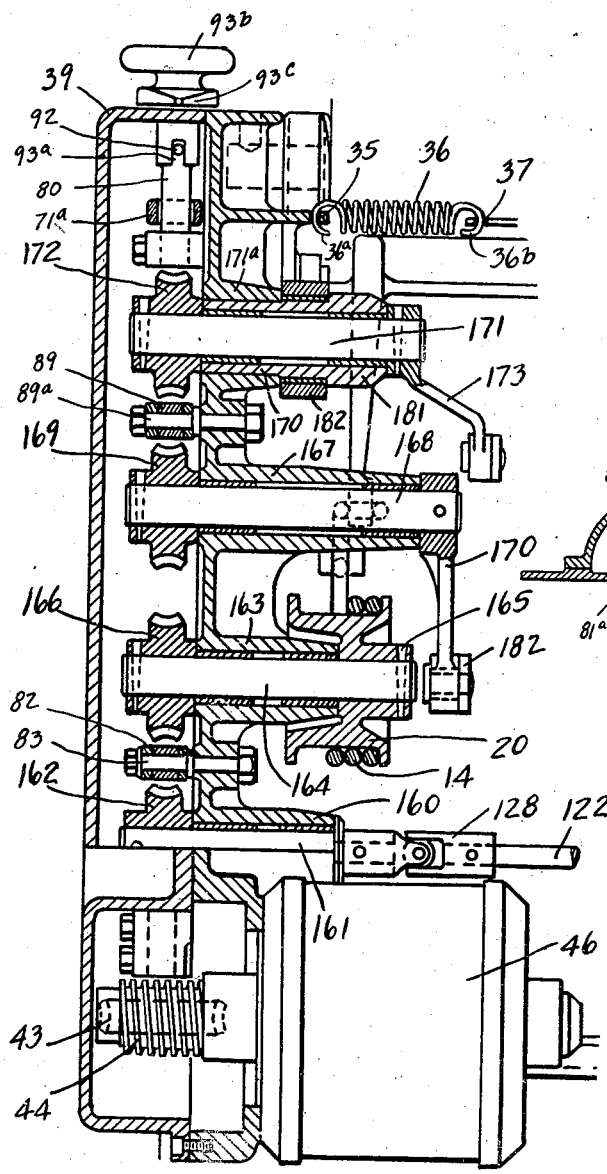
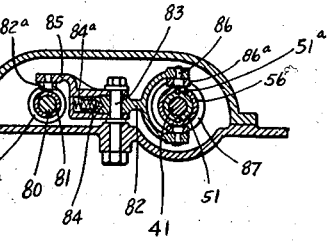
INVENTORS.
CHARLES DREXLER.
RALPH H. MORGAN.
BY
Lockwood, Goldsmith & Galt,
ATTORNEYS.

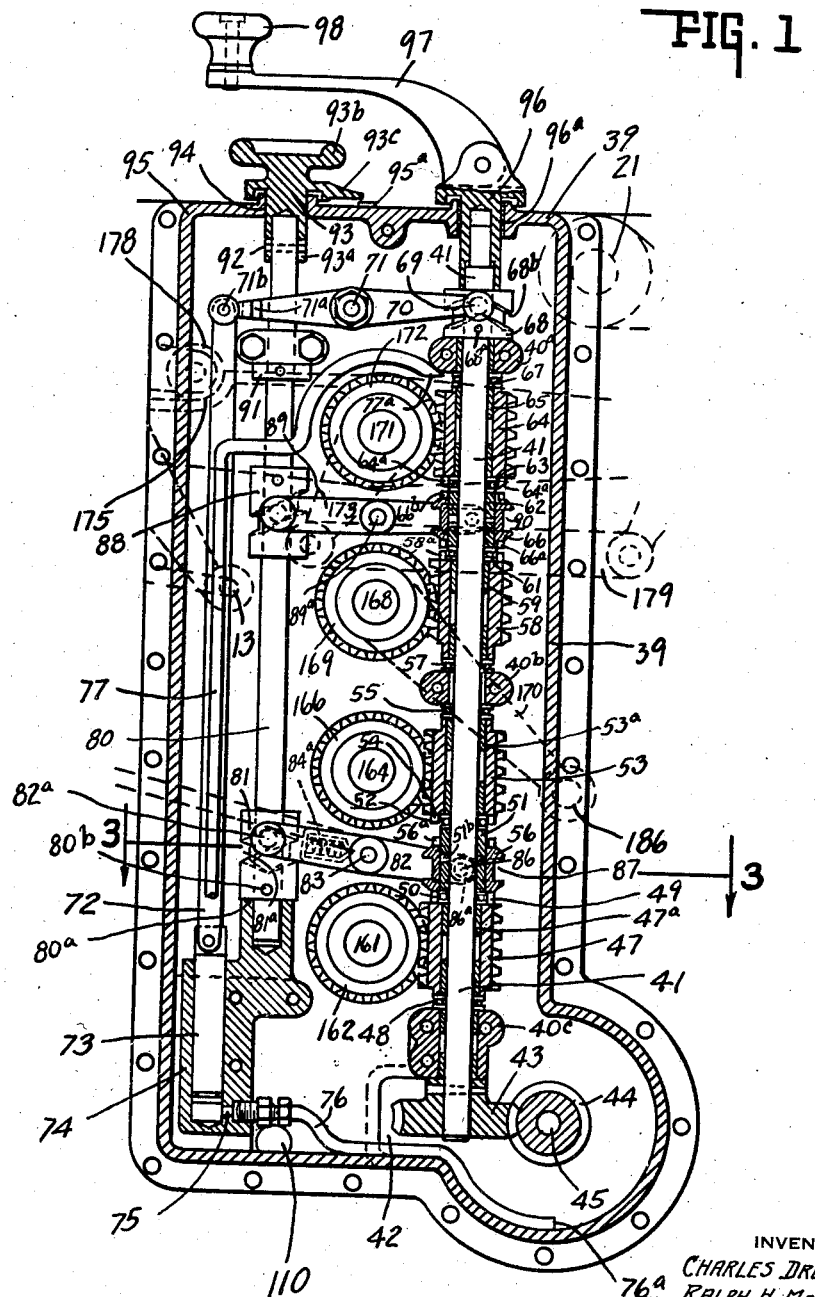

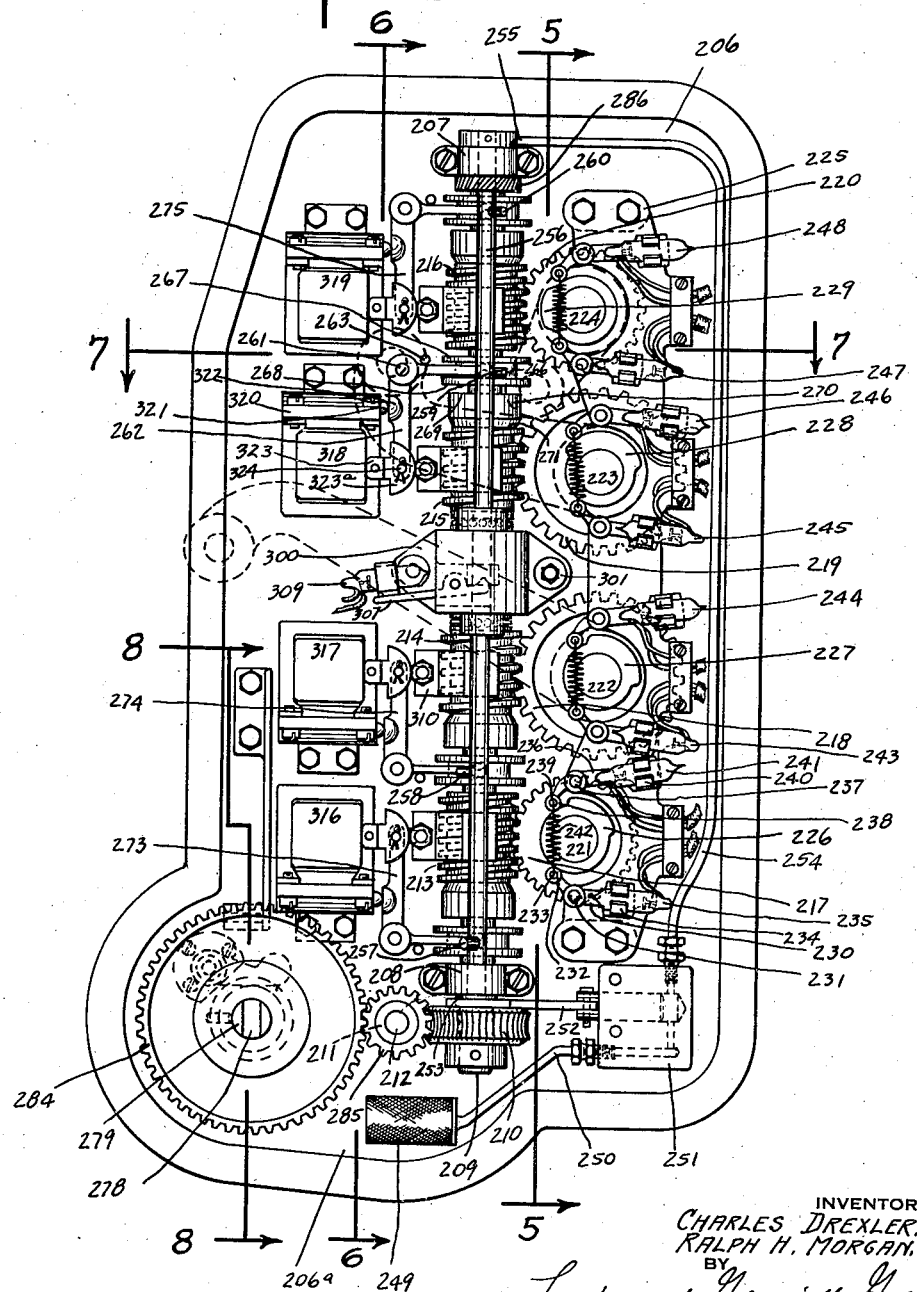

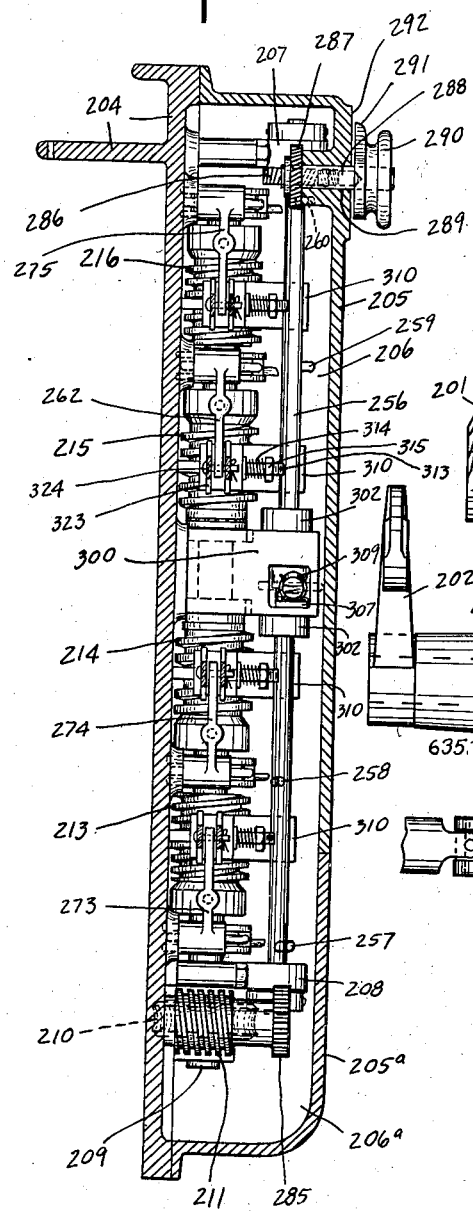
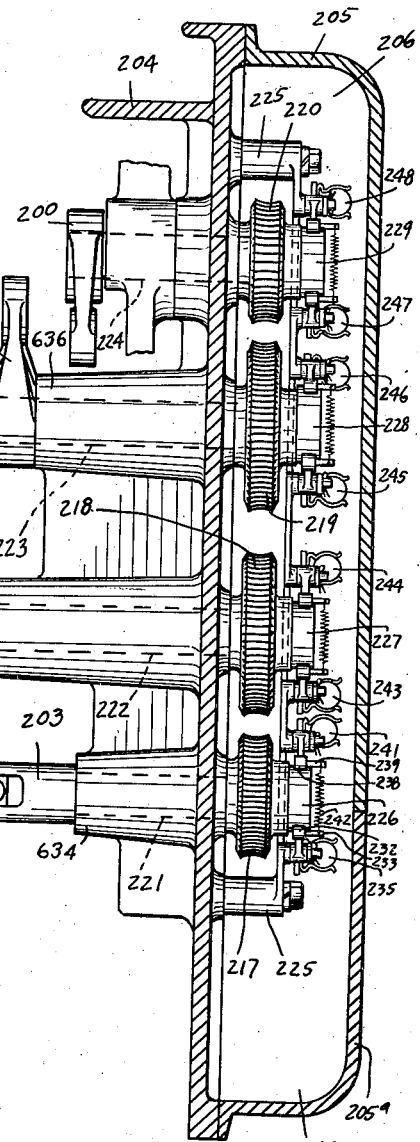

March 26, 1946.   C. DREXLER ET AL   2,397,092
POWER CONTROL FOR ARTICULATED BEDS
Filed Aug. 7, 1942   9 Sheets-Sheet 5
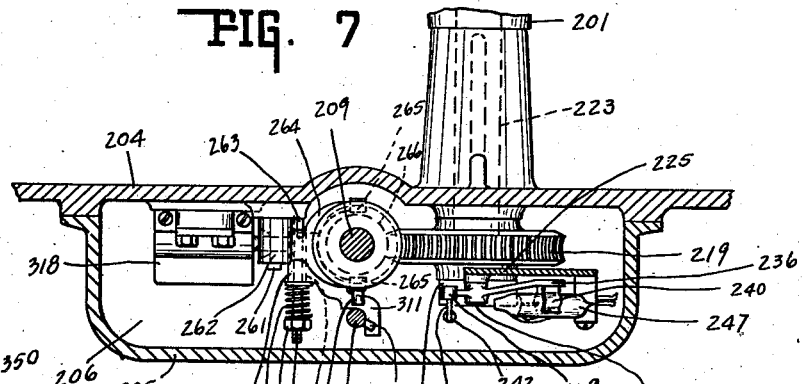
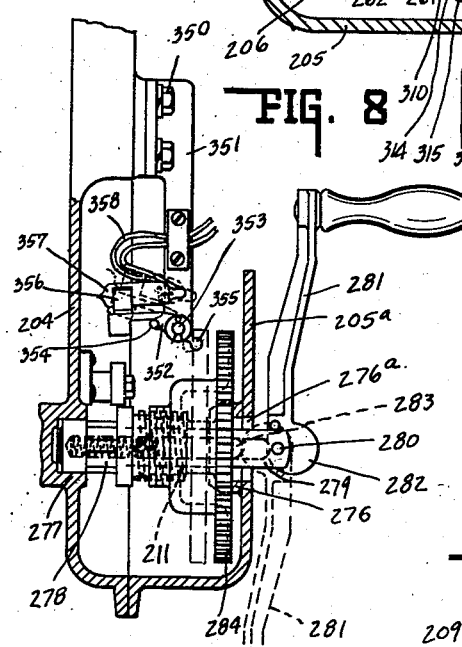
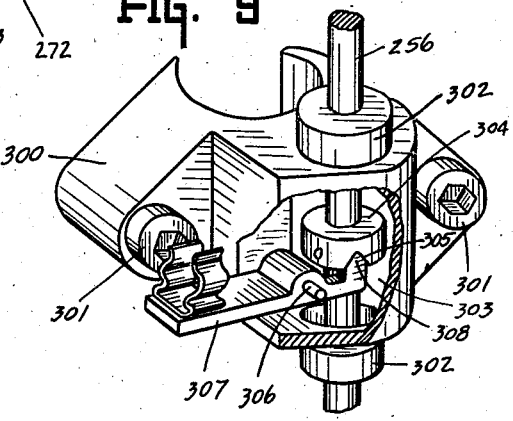
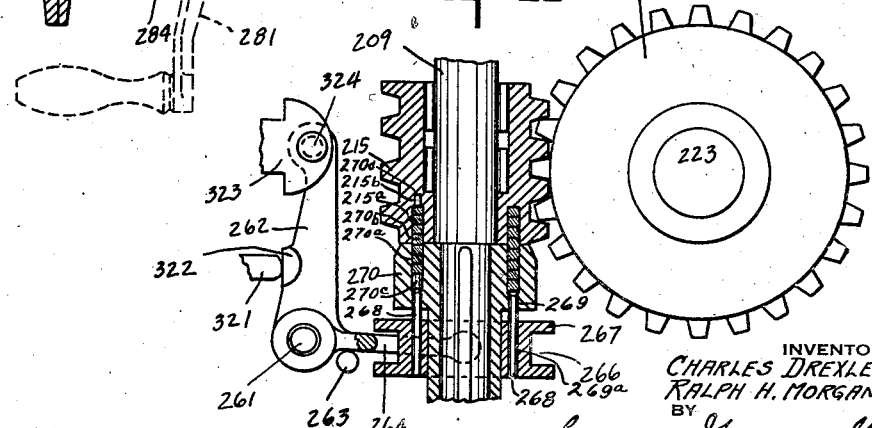
INVENTORS.
CHARLES DREXLER.
RALPH H. MORGAN,
BY
Lockwood, Goldsmith & Galt,
ATTORNEYS.

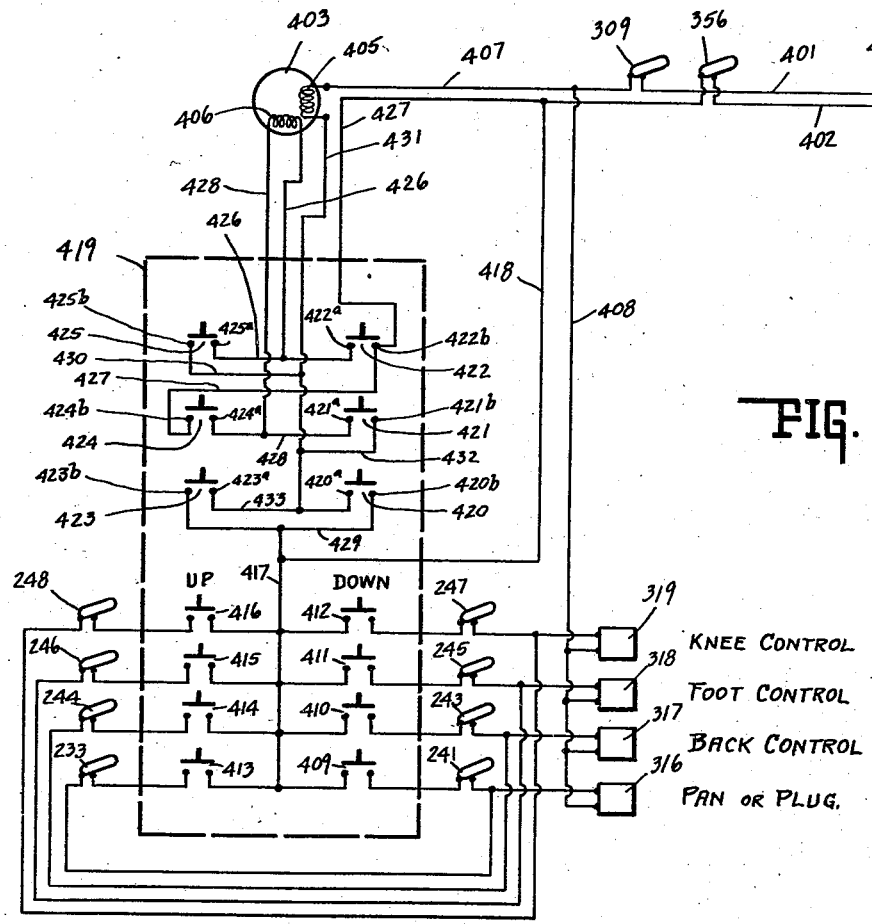
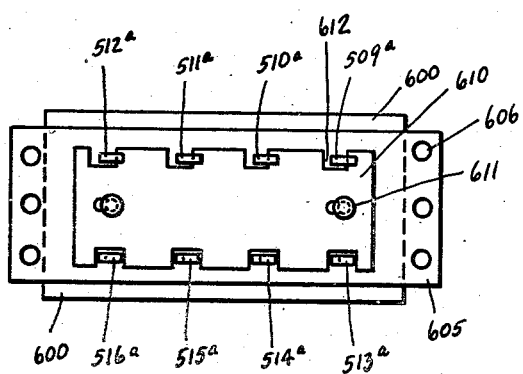

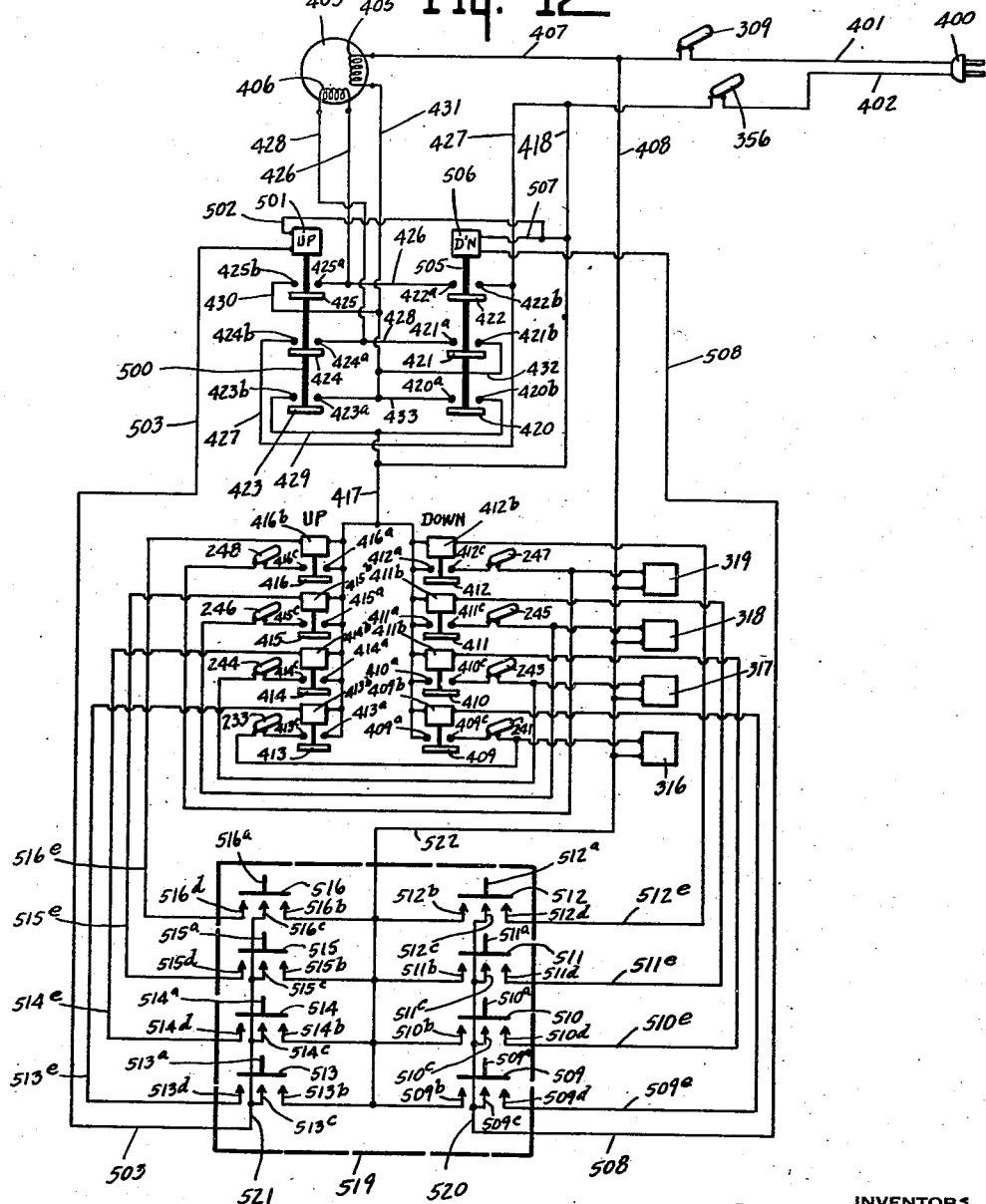

March 26, 1946.  C. DREXLER ET AL  2,397,092
POWER CONTROL FOR ARTICULATED BEDS
Filed Aug. 7, 1942  9 Sheets-Sheet 8
FIG. 13
FIG. 14
FIG. 18
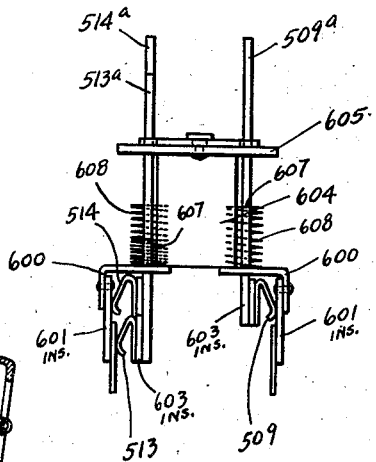
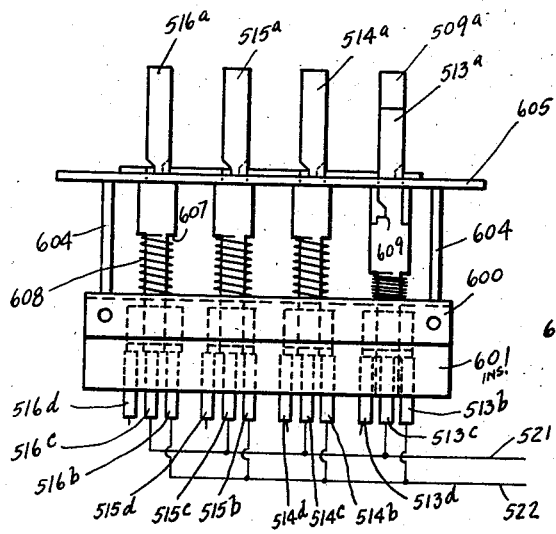
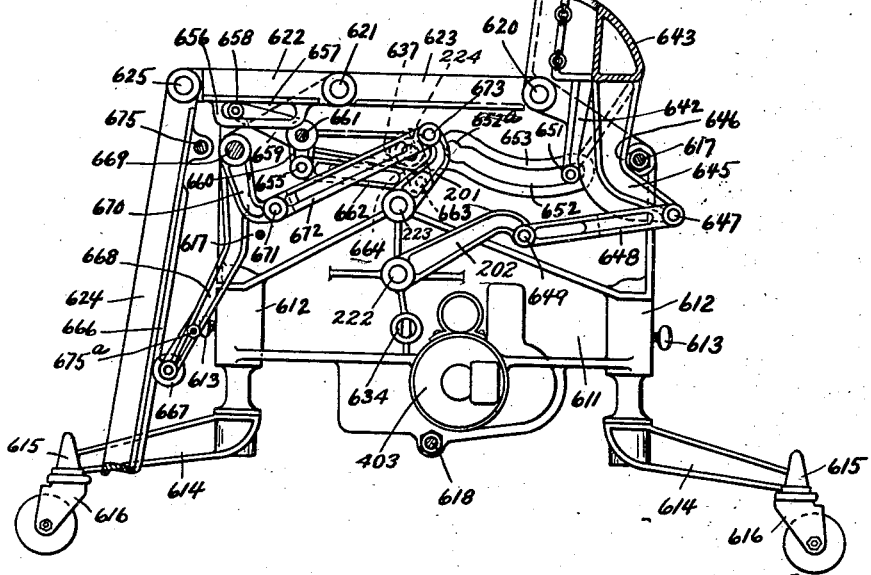
INVENTORS.
CHARLES DREXLER,
RALPH H. MORGAN,
Lockwood, Goldsmith & Galt,
ATTORNEYS.

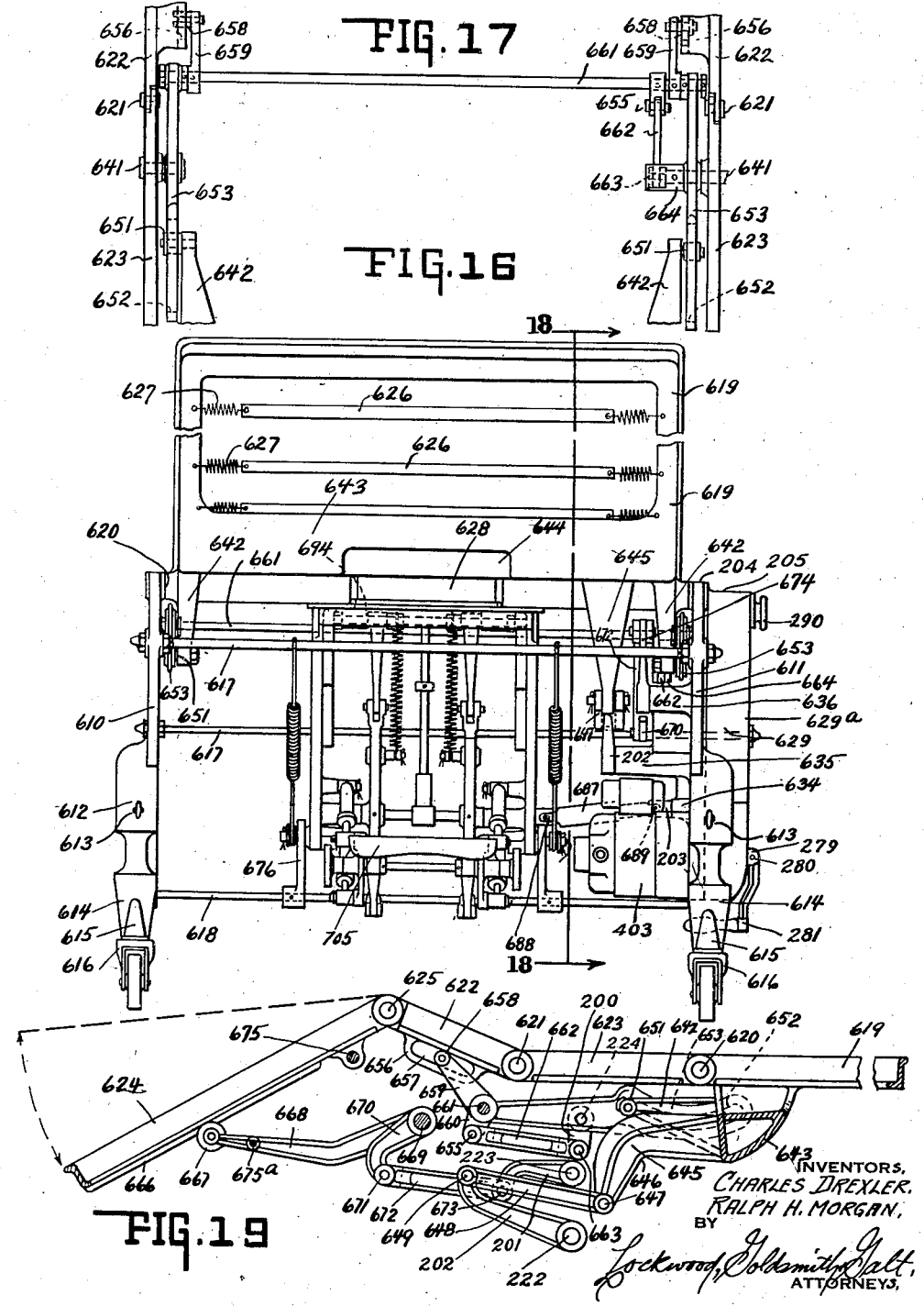

Patented Mar. 26, 1946

2,397,092

UNITED STATES PATENT OFFICE 2,397,092

POWER CONTROL FOR ARTICULATED BEDS

Charles Drexler and Ralph H. Morgan, Indianapolis, Ind., assignors to Dr. Robert R. Freund, Mount Carmel, Ill.

Application August 7, 1942, Serial No. 454,002

2 Claims. (Cl. 5—66)

This invention relates to a power and control device suitable for posture and hospital bed structure control and operation.

This application is a continuation-in-part of application Serial No. 323,676, filed March 13, 1940, which in turn was a continuation-in-part of application Serial No. 152,718, filed July 9, 1937, now Patent No. 2,261,980, dated November 11, 1941. The central portion of Fig. 1 and Figs. 2 and 5 of said patent appear herein as Figs. 1 to 3 respectively.

In so far as Figs. 4 to 10, herein, are concerned, the power and control, specifically illustrated therein, constitute portions of an articulated bed structure more particularly illustrated and described in the copending application, Serial No. 323,677, also filed March 13, 1940, and entitled, "Hospitalization and posture bed" and Figs. 1, 1-A, 2 and 3 thereof appear herein as Figs. 16 to 19, inclusive, respectively. This last mentioned application is now Patent No. 2,308,592, dated January 19, 1943.

The chief object of this invention is to provide a power and control device for a posture and hospital bed which device is arranged to selectively actuate, in reversible driving arrangement, a plurality of power elements and to operate the same by an electric reversible motor or by hand, as desired.

The chief feature of the invention consists in including in a compact arrangement the main mechanism whereby the foregoing object is accomplished.

Another feature of the invention is the remote control switch for automatic selective control.

Other objects and features of the invention will be set forth more fully hereinafter.

The full nature of the invention will be understood from the accompanying drawings and the following description and claims:

In the drawings,

Fig. 1 is a vertical sectional view on an enlarged scale of a power control unit embodying one form of the invention.

Fig. 2 is a vertical sectional view of a portion of the same and being approximately a central sectional view through Fig. 1.

Fig. 3 is a transverse sectional view on a smaller scale and is taken on line 3—3 of Fig. 1 and in the direction of the arrows.

Fig. 4 is a view similar to Fig. 1 and of a second form of the invention.

Fig. 5 is a sectional view taken at right angles to Fig. 4 and substantially in the plane indicated by line 5—5 in Fig. 4 and in the direction of the arrows.

Fig. 6 is a similar view taken substantially in the plane indicated by line 6—6 in Fig. 4.

Fig. 7 is a transverse sectional view taken substantially in the plane indicated by line 7—7 in Fig. 4 and in the direction of the arrows.

Fig. 8 is a similar view taken substantially in the plane indicated by line 8—8 in Fig. 4.

Fig. 9 is a perspective view of a portion of the mechanism shown in the central portion of Fig. 4.

Fig. 10 is a central sectional view of one of the power worms and associated clutch construction.

Fig. 11 is a diagrammatic wiring diagram of an electrical arrangement suitable for use in the second modification of the invention disclosed herein and the same includes a switch arrangement wherein the switches carry the line or power current, said switches directly controlling the motor reversal and the several solenoid controls for the clutches, together with limit switches.

Fig. 12 is a similar view but illustrates a push button arrangement wherein the push button or like switches remotely control the motor reversal and the several clutch operating solenoids, power or line current being directly handled by relay operable switches, the relays in turn being controlled by the push button arrangements or switches of the same voltage.

Fig. 13 is a side elevation of one form of push button station structure, the base and cover being omitted.

Fig. 14 is an end elevation of said structure.

Fig. 15 is a top plan view thereof.

Fig. 16 is a view similar to Fig. 1 of Patent No. 2,308,592 and is a rear elevational view of a second bed structure embodying the second form of the invention shown in Figs. 4 to 10 herein, the back section of the bed frame being shown elevated and the movable foot and knee sections and the stationary section being omitted since in this view the same are concealed by the back section, the pan support being shown in lowered position and the plug section mechanism being shown in the elevated position.

Fig. 17 is a view similar to Fig. 1-A of Patent No. 2,308,592, and is a plan view of the knee section control broadly disclosed in Fig. 16.

Fig. 18 is a vertical sectional view through the invention illustrated in Figs. 16 and 17, the same being taken approximately in the plane 18—18 of Fig. 16 and in the direction of the arrows, the foot and knee sections of the bed being illustrated in the lowered and horizontal positions, respectively. Fig. 18 is a view similar to Fig. 2 of Patent No. 2,308,592.

Fig. 19 is a view similar to Fig. 3 of Patent No. 2,308,592 and is a vertical sectional view of the mechanism illustrated in Fig. 18 but with the back or head section of the bed in horizontal position and the foot and knee sections reversely positioned in tilted positions although generally horizontally directed, this being the knee strain relieving position, the heavy broken horizontal line to the left indicating the position of the foot section when elevated to substantially horizontal position when the circulation of the patient requires that the legs be elevated relative to the head and torso.

The first embodiment of the power control structure is illustrated in Figs. 1 to 4 inclusive and same may be incorporated in an articulated bed structure such as illustrated in Patent No. 2,261,980. Such power control is included within a housing 39 and therein there is provided aligned bearings 40a, 40b and 40c in which is mounted a shaft 41. The lower end of the shaft mounts in the chamber 42 a worm wheel 43 meshing with a worm 44 carried by the motor shaft 45 in the chamber 42. The motor shaft 45 is operable by the motor mechanism embodied in the electric motor which is of the reversible type and which is provided with suitable controls for initiating motor operation in either direction of rotation, such control mechanism being of the normally open switch type in that it requires manual maintenance of the switch in the closed position to secure motor energization and release from said manual operation immediately causes cessation of rotational movement, the switch being of dual character such as is necessary to secure reverse rotation of the motor.

As herein illustrated, the rotational power is derived in the present disclosure, as thus far described, from the reversible motor. As shown in Fig. 2, the motor 46 is suitably mounted on the housing structure.

Rotatably mounted on shaft 41 is a gear 47, and if desired, an anti-friction construction 47a may be interposed therebetween. The gear 47 bears at its lower end on a thrust bearing arrangement 48 in turn bearing on the shaft bearing 40c. The gear 47 has a toothed clutch face 49 and nests an anti-friction construction 50 which supports a sleeve 51 keyed to the shaft 41.

Bearing on the upper end of sleeve 51 is an anti-friction structure 52 against which bears another gear 53 similar to gear 47 and similarly mounted as at 53a on said shaft 41 but in reversed relation is a clutch with face 54 of toothed character so that in this instance the clutch face 54 is positioned adjacent but spaced from the clutch face 49. Thus, the two gears are maintained in spaced relation and are prevented from axial movement by the inclusion of a thrust bearing structure 55 between the gear 53 and the bearing 40b.

A clutch member 56 has the opposite clutch faces with teeth 56a and 56b either of which is adapted for engagement with the teeth 49 or 54, respectively, of the gears 47 and 53. The clutch member 56 is of a length sufficient to, as stated, engage either of the gears, or, as illustrated, to be positioned intermediate the same and be free from adjacent gear tooth face engagement. The clutch member 56 has a spline or equivalent connection with the sleeve 51, so as to be capable of longitudinal movement relative thereto but incapable of relative rotational movement, so that said clutch member rotates with the shaft 41 and in the direction of shaft rotation. Each gear 47 or 53, therefore, may be disconnected from the source of power or may be connected thereto and rotated in either direction, as will be more fully pointed out hereinafter.

Positioned above the bearing 40b is a thrust bearing structure 57 and another gear 58 is rotatably supported on the shaft as at 59 and is provided with a clutch face having teeth 58a. The anti-friction structure 61 nested therein serves as a spacer for the sleeve 62 rigidly secured to the shaft 41 and the thrust bearing 63 maintains the gear 64 in predetermined position, the latter being rotatably supported as at 65 on the shaft 41. The gears 58 and 64 have the adjacent clutch engageable teeth faces 58a and 64a, respectively, and the clutch member 66 has the clutch faces with teeth 66a and 66b at opposite ends for selective engagement with the teeth 58a and 64a of the clutch faces before mentioned. The clutch member 66 has a splined or equivalent connection with the bushing or sleeve 62 similar to that previously described with reference to the clutch member 56 with its supporting and driving sleeve 51. Fig. 1 illustrates the neutral position of the clutch member 66.

To prevent endwise play and maintain predetermined clearances and positionings, there is interposed between the gear 64 and the bearing 40a the thrust bearing structure 67. Pinned to the upper free end of the shaft 41 as at 68a is a power cam 68 having the cam groove 68b therein and a follower 69 rides in said groove and is carried by the rocker arm 70 pivoted at 71. The rocker arm is apertured as at 71a for the purpose hereinafter set forth and adjacent said aperture is pivotally connected as at 71b, to the connecting rod 72 in turn connected to a piston 73 slidably mounted in the pump cylinder 74 which is provided with an intake port 75, the latter being connected by the conduit 76 to the chamber 42 and terminating at 76a in the lowermost portion thereof. The discharge port and its connection to the discharge line 77 is not illustrated herein.

The discharge line 77 terminates at 77a adjacent the bearing 40a and thus in the rotation of shaft 41 the rocker arm is continuously actuated and the lubrication pump similarly actuated to supply lubricant to the power and control mechanisms previously described, and mounted upon the shaft 41.

The means for selectively controlling the several clutch constructions may be set forth briefly as follows: A shaft 80 is rotatably supported in a bearing 80a formed as a part of the pump housing. Pinned thereto at 80b and bearing on the end of the bearing 80a is a grooved cam 81 having the cam groove 81a therein.

A clutch shifter lever 82—see Fig. 3—is pivotally supported at 83 and is yieldingly locked by a plunger 84 and spring 84a to an arm 85 pivotally supporting the roller 82a which is positioned in the groove 81a. The lever 82 is bifurcated at one end and each arm thereof pivotally supports at 86 a roller 86a which rides in the groove 87 of the clutch member 56, splined as at 51a to the sleeve 51 which is pinned to the shaft 41 as at 51b.

It will be obvious from the shape of the cam 81 that the clutch shifter lever structure may be moved so as to position the clutch in neutral position or in either selective gear driving position.

In a similar manner, there is suitably secured to the shaft 80, a grooved cam 88 with which is associated a similar type lever structure 89 pivoted at 89a and operatively associated with the groove 90 in the clutch member 66. The two cams 81 and 88 are so positioned on shaft 80 that independent clutching of any gear 47, 53, 58 or 64 to the main shaft 41 may be effected or no gear may be so connected. Note also that the pump operates only when the shaft 41 rotates and irrespective of the direction of shaft rotation.

The shaft 80 has pinned thereto a collar 91 which maintains the shaft against axial displacement. The free end of the shaft 80 supports a transverse pin 92 which is adapted to be interlocked with a toothed socket structure 93 having the teeth 93a thereon and having a handle portion 93b, and a pointer or indicator portion 93c. The portion 93 is rotatably supported in the opening 94 formed in the cover portion 95 of housing 39 which is the housing for all of the aforesaid power mechanism. 95a indicates a scale or like legending so that by manual manipulation of the member 93b all the gears may be free from rotation or any one of the gears may be rotated and, of course, the direction of rotation depends upon the then direction of rotation of the motor before mentioned.

In place of motor operation, there may be associated with the upper end of the shaft 41, a cap type socket 96 having a cooperative engagement with the upper end of the shaft 41 and provided with a handle 97 terminating in a knob 98. The member 96 is rotatably supported in the aperture 96a formed in the cover 95. When the motor is not employed, it will, of course, be evident that shaft 41 may be manually rotated, through the handle structure described, in either direction and the proper power operation obtained therefrom, depending upon the corresponding setting of the manual member 93.

Reference will be had now more especially to Fig. 2 and also to a limited extent to Fig. 1. Rotatably supported in the bearing 160 is a shaft 161 which is connected by a universal coupling 128 to a shaft 122 for rotating said last mentioned shaft in either direction and for operating the bed pan and mattress plug supporting mechanism, and for the purpose set forth in the copending application. The shaft 161 has secured to it, in the chamber formed by the housing 39, the gear 162 which is in continuous mesh with the gear 47. In a bearing 163 thereabove is rotatably mounted a shaft 164 to which is secured for back section or bed part movement the drum 20 as at 165 and within the chamber formed by housing 39 there is secured to shaft 164, the gear 166 which is in continuous mesh with the gear 53.

In a bearing 167 thereabove, is rotatably supported a shaft 168 which has rigidly secured to it in the chamber formed by the housing 39, a gear 169 which is in continuous mesh with the gear 58. The other end of the shaft 168 has rigidly secured to it a lever arm 170 for bed part movement, this being the foot section.

In a bearing 171a thereabove is rotatably supported a shaft 171 which has rigidly secured to it in the chamber formed by housing 39, a gear 172 which is in continuous mesh with the gear 64. The other end of the shaft 171 has pinned or otherwise rigidly secured to it, an offset lever 173 for intermediate section movement independent of the movement imparted thereto by back section movement.

The shaft 171 is rotatably supported in the sleeve 170—181 mounted in the bearing 171a and said sleeve also is suitably supported as at 182—see Fig. 2—to insure rigidity and alignment of the parts, said bearing 182 being rigid with a power supporting frame member to which the housing 39 is secured.

The winding drum 20 mounting the cable 14 is the actuated element for raising and lowering the so-called head or back section referred to. The lever 170 is the actuated element for securing the operation of the tiltable foot section. The lever 173 is the actuated element to secure the operation of the tiltable intermediate or knee section. When the respective shafts are selectively operated the various bed sections and the bed pan and plug section are actuated or moved, as desired.

Briefly stated, the invention specifically disclosed in the present application in Figs. 1 and 2 is a motor drive of reversible character for the vertically disposed power shaft 41 upon which is mounted certain gears which may be selectively clutched to the shaft 41 and which continuously mesh with certain shafts positioned at right angles thereto and herein designated by the numerals 161, 164, 168 and 171. The selective clutching of the respective gears on shaft 41 to said shaft is obtained through the two lever structures which extend between shaft 41 and shaft 80. Shaft 80 is the manual selective control arrangement. In other words, positioning of the hand engageable portion 93b—see Fig. 1—in predetermined position, insures that through the two cam structures 88 and 81 one of the two levers last mentioned will be appropriately actuated so that the shaft and gear connecting members 56 and 62 are selectively actuated for power connection. Should there be a power failure, the bed controls can nevertheless be actuated manually and this is possible by rotating the handle 97. When power operable, the handle 97 is normally disengaged from the shaft 41. As previously described, the arm 70, operable by the cam 68 on shaft 41 in the rotation of said cam, actuates the lubricating pump including piston 73 to discharge lubricant to the respective gearings.

In hand operation, the motor, of course, is not energized and, therefore, the gear 43 and worm 44 will merely introduce an increased friction load and the inertia of the motor armature will merely be imposed at the starting of rotation, the worm and worm wheel connection being of such character that wedging or locking therebetween does not occur.

The second embodiment of the invention is more particularly illustrated in Figs. 4 to 10, inclusive, for the power and control and Figs. 16 to 19 for an articulated bed structure in which the aforesaid is incorporated.

In Figs. 4 to 9, inclusive, and Fig. 16 the numeral 204 indicates a stationary portion of the bed device frame and the base or main plate of this invention embodiment. It is provided with a cover 205 to form a control chamber 206. In this control chamber is mounted certain control solenoids and most of the control mechanism including switches and the like, cams, gearing, clutches, et cetera. Within this chamber 206 and in the bearings 207 and 208, is mounted a drive shaft 209. The lower end of this shaft projects beyond the lower bearing 208 and mounts a worm wheel 210 which meshes with the gear 211 carried by the shaft 212 which is reversely rotated by a reversible motor, not shown in Figs. 4 to 9, but indicated at 403 in Figs. 11 and 12 and 403 in Fig. 16.

Rotatably mounted on shaft 209 and in ascending relation, is a worm 213 and thereupon in succession, worms 214, 215 and 216. These worms mesh, respectively, with gears 217, 218, 219 and 220, each carried by shafts 221, 222, 223 and 224, which shafts in turn mount or are connected, as shown in Fig. 5, to the shaft 203 and the levers 202, 201 and 200, respectively.

There is suitably secured to the portion 204 in the chamber 206 a support 225 and this extends and partially embraces, as it were, the gears 217 to 220, inclusive. Upon the casing projecting ends of said shafts 221 to 224, inclusive, there are mounted cams 226, 227, 228 and 229, respectively, see Fig. 4.

Adjacent each of the cams and pivotally supported by the auxiliary base structure 225, is a pair of levers and the adjacent ends thereof are yieldingly connected together, thereby constraining said portions toward cam engagement. Each of the other ends of the levers and remote from the cams, mounts a limit switch in the form of a mercury switch, the purpose of which will be set forth more fully hereinafter. Since each pair of lever structures with the cam engaging portions, connecting springs and limit switches is substantially the same, except for limit switch positioning incident to effecting the desired controls, a description of one of these arrangements will suffice for a description of all.

In the lower right hand portion of Fig. 4, the lower cam lever is indicated by the numeral 230 and it is pivotally supported at 231 on the auxiliary housing or support 225. The end 232 of this lever is arranged for adjacent cam surface engagement. It also carries a pin 233. The other end of said lever 230 supports a clip structure 234 in which is mounted a mercury switch 235. There above and in opposed relation is a similar lever 236, see also Fig. 7, pivotally supported at 237 and having a cam engaging portion 238 and a pin 239, the opposite end of the lever mounting a clip structure 240 in which is mounted the mercury switch 241. A spring 242 is connected at opposite ends to the pins 239 and 233 and normally constrains portions 238 and 232 into engagement with the cam 226 interposed therebetween.

In a like manner, there is associated similar lever and limit switch constructions with the cams 227, 228 and 229, the upper and lower positioned switches thereon being designated, respectively, 243 and 244, 245 and 246, and 247 and 248.

Referring more particularly to Fig. 4, it is to be noted that shaft 224 carries the cam 229 and the high point of this cam is adapted to selectively engage the upper and lower bearing portions of the left hand ends of the upper and lower oppositely positioned levers carrying the limit switches 247 and 248. When the limit switch 248 is positioned so that its contact point rides the high point of the cam 229, the mercury flows to the right hand end of the tube and the circuit is opened through the terminals at the left hand end of said switches. When this occurs, the knee section 622, see Figs. 18 and 19, of the bed is at its uppermost limit of elevation, which is about 30° to the horizontal of the bed when all other sections are arranged flat or horizontal, see Fig. 19.

When the portion of the lower lever engages the high point of the cam 229, the switch 247 will be tilted so the mercury flows from the right hand end of the switch to the left hand end thereof, which opens the circuit through the terminals at the right hand end of said switch. This corresponds to the knee portion 622 of the bed being in its lowermost position, which is substantially horizontal, see Fig. 18.

When the high point of the cam 228 contacts the end of the uppermost lever adjacent thereto, the mercury switch will be tilted as shown in Fig. 4, the mercury running to the right hand end and away from the terminals at the left hand end. When this position is attained the foot section 624, see Figs. 18 and 19, is in its lowermost position and in that position, see Fig. 18, it is substantially vertical or transverse to its original or substantially horizontal position, see Fig. 19, dotted line.

When the cam portion 228 engages the adjacent portion of the lower lever associated therewith, the switch 245 is tilted from the position shown in Fig. 4 to an opposite inclination, whereupon the mercury leaves the terminals at the right hand end of said switch and thus opens the circuit therethrough. This is the position corresponding to when the foot section of the bed is substantially horizontal.

When the cam 227 engages the contact portion of the uppermost lever adjacent thereto, the switch 244 will be tilted to an opposite inclination from that illustrated and upon such tilting, the mercury will flow from the lower left hand end to the right hand end of the tube leaving the terminals and opening the circuit therebetween. This corresponds to the highest position the back section 619 of the bed can attain and when in that position, the back portion is substantially vertical 619.

When the cam 227 engages the adjacent portion of the lowermost lever associated therewith, the switch 243 will be tilted to an opposite inclination from that illustrated and the mercury will leave the right hand end of the tube and flow to the left hand end opening the circuit through the terminals at the right hand end. When this action occurs, the back section 619 is substantially horizontal, see Fig. 19.

With respect to the lowermost cam 226 it will be noted that when the uppermost switch is riding the cam portion the switch is so arranged that the mercury flows from the left hand end to the right hand end and leaves the terminals at the left hand end. In other words, the pad or plug 644 of the bed structure is now at its highest position and in registration with the opening in the mattress and the bed, as previously described, see Fig. 16.

When the cam portion 226 engages the cooperating portion of the lowermost lever, the mercury now shown at the right hand end of the tube and bridging the terminals flows to the left hand end, opening the circuit through the terminals at the right hand end. When this action occurs, the pan support portion 705, see Fig. 16, of the bed is at its highest or elevated position and in registration with the opening of the mattress and in the structure, as previously described but not illustrated herein.

This brief explanation of the operation of the various travel limit switches is thus briefly set forth so that a complete understanding may be had of the invention in its entirety of which the specific invention herein disclosed and claimed is but a portion. These several switches are in series, individually, with the respective eight switches in the manual push button switch station structure hereinafter to be briefly described.

The specific mounting of the several limit switches, hereinafter to be referred to, is shown clearly in Figs. 4 and 7.

Similar to the previous disclosure, there herein is provided a sump 206a, see Figs. 4 to 6, and therein is mounted a screen or intake 249, see Fig. 4, connected to a conduit 250 constituting the intake to a pump structure 251 having a power connection 252 in the form of a connecting rod which is operable by a cam 253 mounted on the main shaft 209.

The pump structure has a discharge line 254 which extends upwardly to the top of the chamber 206 and is directed laterally and has a mouth portion 255 that discharges adjacent the upper bearing 207 that supports the shaft 209. The pump structure last described is comparable to the pump structure previously described for the first form of the invention and herein the second form is illustrated in Fig. 4.

The manual power arrangement of the second form is shown herein and is illustrated in Figs. 4 and 8 more especially. The manual selective control is illustrated herein and more especially in Figs. 4, 6 and 7. In these figures it will be observed there is provided a shaft 256 and this shaft is rotatably mounted in bearings but is capable of rotation. It also carries at appropriately spaced axial intervals, four pins, to-wit, 257, 258, 259 and 260, and the respective pins may be said to be angularly offset with respect to each other approximately 72°. Therefore, when any one of the four pins is extending toward the main power shaft, it is the effective controlling pin and is effective for power shaft control purposes. This pin operates the individual manual control and the latter also is effective through a mechanism that is also remotely, manually controlled by means of the appropriate manually operable push button switch controlling the solenoid, previously mentioned, that is effective, when energized, to actuate the individual control mechanism, last mentioned.

It might be briefly stated that when electrical power is utilized and the electrical control is energized, a safety feature is incorporated in that each of the several limit switch means, previously described, is effective to control said solenoid automatically to prevent over actuation of the power. Removal of finger pressure on the push button switch mentioned, and its automatic return to open circuit position, naturally insures instant stoppage of the power application.

For an understanding of both direct manual and manually remote electrical control of selective power application, the foregoing has been briefly stated, and reference now will be had to one of the aforementioned mechanisms and a detail description thereof will suffice for the other three as well, since they are substantially identical, although as will be observed, the two upper mechanisms—see Fig. 4—are reversed in position relative to the two lower mechanisms.

Pivotally mounted on post 261, see Fig. 4, is an angle lever 262, the "out" position of which is limited by a pin 263 also carried by the base or frame structure 204. The arm portion 264 is bifurcated, as illustrated in Figs. 7 and 10 and the two arms carry inwardly directed pin portions 265 which ride in the groove 266 in the clutch collar member 267 and is slidably secured at 267a to the main power shaft 209 and rotates therewith and is slidable longitudinally thereon.

Clutch member 267 at 269a includes pins 268 that slide longitudinally in bores 269 in clutch member 270—see Fig. 10. Seated in circular recess 270a is a coiled spring 270b of clutch type having angular end 270c which is adapted to be engaged by one of pins 268 when the member 267 is caused to approach member 270. This is of reversible drive character.

The adjacent gear 215 herein—see Fig. 10—is similarly recessed as at 215a and a hole 215b receives the angular end 270d of the opposite end of the spring 270b seated in the angular recess.

When collar member 267 is moved toward member 270 and since member 270 rotates with and gear 215 freely rotates on shaft 209, in the rotation of shaft 209, the closest pin 268 engages the angular end 270c and winds up said spring or unwinds the same, depending on the direction of rotation of shaft 209. Upon sufficient winding movement, the spring 270b locks the member 270 to the gear 215 and this lock is of internal or external character depending upon how the spring is then wound and then gear 215 rotates with shaft 209. Note that clutch 270 is splined to shaft 209 so the power to gear 215 is through this spline and not through pins 268, same being merely clutch control pins.

As a result a solenoid having a 2-pound pull is satisfactory for control purposes whereas if such a control be not employed, a solenoid of 200-pound pull would normally be required. This 100:1 ratio reduction is solely due to the inherent characteristics of the clutch disclosed herein.

The arm portion more remote from the base 204 of the lever arm portion 264 carries a cam projection 272 and when this cam portion is engaged by the adjacent pin 259, the lever 262 is tilted upon its pivot 261 and the clutch collar or sleeve is moved downwardly, as described. After a predetermined amount of rotation of the main shaft 209, if necessary, the clutch connection becomes operative to insure rotation of the gear 215 by the main shaft 209. This rotation is continued as long as desired and since manual operation of the main shaft is relatively slow, no safety or travel limit device is provided in this arrangement. There are, as stated, herein, four of these clutch control members and four cooperating master pins on shaft 256—see Fig. 6—and four cooperating clutch and clutch collars. The four levers for controlling the rotation of the four worms 213, 214, 215 and 216 are designated by the numerals 273, 274, 262, and 275, respectively—see Fig. 4, and 262 is shown larger in Fig. 10.

Reference now will be had to Figs. 4 and 8. Mounted in the base of the lower cover portion 205a, is a bearing 276 defined by an opening 276a and opposite thereto in the base 204 is provided a bearing 277. A shaft 278 is mounted in the latter bearing and extending forwardly therefrom is a pair of ears 279 that project through the enlarged opening 276, as shown in Fig. 8. Pivotally mounted in these ears as at 280 is a hand crank 281 having the cam portion 282. The cam portion 282 normally, when the handle is in the dotted line position, engages a central element 283 and serves to position the gear 284 in the dotted line position—see Fig. 8. In this position, see also Fig. 16, this gear 284 does not engage the gear 285 carried by the motor shaft. When the handle is positioned as shown in the full lines in Fig. 8, this gear 284 does engage the gear 285 and thus the handle is connected to the motor shaft and by the worm 211, previously described. The main power shaft 209 is rotated through the wheel 210 that meshes therewith. This is a reversible drive arrangement.

Since Fig. 8 discloses fully the specific details of this hand power drive and its operation is quite apparent from said disclosure only casual reference will be had thereto hereinafter.

Reference now will be had more especially to the upper portion of Fig. 6 and also the upper central portion of Fig. 4. The upper end of the shaft 256 has suitably secured to it a spiral gear 286. Meshing therewith and at right angles thereto is a similar gear 287 carried by a shaft 288 that extends through the opening 289 in the cover 205.

Suitably secured to the exposed end of this shaft is a hand wheel 290 with the pointer portion 291, see also Fig. 16. This pointer portion cooperates with a dial arrangement indicated by the numeral 292, in Fig. 6.

Reference now will be had to the central portion of Figs. 4 and 6, and 9, wherein there is illustrated a safety control so that the device may not be electrically controlled while the manual control is effective. As illustrated clearly in said figure, a casting 300 is suitably secured as at 301 to the main base 204 and encircles the shaft 209 and forms a rigidizing bearing therefor. Also rotatably supported in this casting, is the shaft 256 provided with axial play preventing collars 302 above and below the casting.

Within the casting in the chamber 303 thereof there is suitably secured to the shaft a collar 304 which has a recess 305 in its lower face. Pivotally supported in said chamber as at 306 is a lever member 307. The tongue portion 308 at one end is adapted to ride the collar 304 or seat in the recess 305. It only seats in the recess 305 when the pointer 291—see Fig. 6—is in the neutral position, that is, it points straight upwardly. When the finger piece or knob 290 is rotated either to the right or left, it will be obvious that shaft 256 will be rotated and thus the lever 307 will be tilted. When tilted in this position the mercury switch 309—see Figs. 4 and 6—is arranged so that the mercury in said switch does not close the circuit controlled by said switch. It is only when the tongue portion 308 seats in the notch or recess 305 that the mercury in this switch closes the circuit across the contacts in said switch 309. This is one of the main automatic master safety switches so that electrical control cannot be effected unless the manual control is in neutral position. When the manual control is in other than neutral position, the electric control of the power through this switch is rendered inoperable.

Reference now will be had more especially to Figs. 4, 6 and 7. In these figures, it will be observed there is provided four brake structures of fibre or the like, and indicated by the numeral 310. This construction is of such character that it has one arm portion 311 bearing on the shaft 256 for support. This constitutes the fulcrum. The brake member 310 is apertured as at 312 and is carried by a threaded post 313 mounted on the base 204. A spring 314, the tension of which is adjusted by the nut 315, serves to force the brake member inwardly and about the fulcrum, to-wit, the shaft 256 and into engagement with the adjacent worm of the main power shaft 209. Since all four brake structures are identical, no further description of the other three is believed necessary. It is to be observed these brake structures serve to prevent coasting or additional rotating after the electrical power has been disconnected.

Reference now will be had more especially to Figs. 4, 6 and 7. Adjacent each one of the levers 273, 274, 262 and 275, and mounted upon the base 204, are the solenoids 316, 317, 318 and 319, respectively, each of which is adapted to control the adjacent associated lever.

Reference now will be had to the solenoid 318 since specific reference has been had previously to the lever 262 and the following description will serve for a description of the solenoid mechanisms associated with the solenoids 316, 317 and 319, as well since they are identical to that associated with solenoid 318. The solenoids support 320 mounts a spring plunger 321 adapted to engage an abutment 322 carried by the depending arm or solenoid operable arm portion of the bell crank lever 262. This tends to tilt the lever 262 and moves the other arm portion into engagement with the stop pin 263, previously described.

The solenoid plunger or core 323 is bifurcated at its exposed end, as indicated at 323a, and the pin 324 extending across the same is associated with the adjacent end of the lever 262 so that upon solenoid energization the lever is caused to tilt clockwise on its pivot 261 and move the clutch collar, as previously described for the manual movement of said clutch collar. These solenoid members as well as the wheel 290 only serve to throw the clutch collar into and out of operative engagement. In other words, in this embodiment or second broad form of the invention, reversal is not obtained through the utilization of selective forward and reverse clutching but solely through the utilization of a single reversible clutch construction, the power shafts in both forms of the invention being reversely rotatable.

For simplification, there so far has been intentionally omitted from the present disclosure, the push button station control arrangement and the wiring diagram in connection therewith. It is sufficient for an understanding of this invention to note that the main power cable to the power supply has a plug connection at its free end for connection to a wall socket. One line of this dual connection goes to the switch 309, previously described, and from that to the other circuit operable devices, including a reversing switch structure.

The push button station includes eight buttons, four marked "Up" and four marked "Down"; one pair of "Up" and "Down" buttons is marked "Back," a second pair is marked "Pan," a third pair is marked "Foot" and a fourth pair is marked "Knee." Depressing any one of these buttons, providing the member 290 is in neutral position, secures the proper energization of the selected solenoid and the proper selective rotational operation of the motor 403, see Figs. 11 and 12, and Fig. 16, for power shaft 209 rotation in the desired direction, provided a second safety device is properly conditioned. This second safety device is shown in Figs. 4 and 7 and is associated with the hand crank 281 and its mechanism.

Briefly stated, whenever the hand crank is in the dotted line position, see Fig. 8, or full line position, see Figs. 16, the electric motor control and power arrangement is conditioned for operation, and whenever the hand crank is positioned in the full line position, as shown in Fig. 8, the control and power of electrical character is in the inoperative condition. This safety control may be briefly described as follows:

Suitably supported as at 350 upon the base 204 is an arm 351 and carried thereby is a lever 352, the same being pivoted thereon as at 353. Its normal position is limited by the pin 354 carried by an extension of the arm 351.

The lever includes an actuating portion 355. The lever at its opposite end constitutes a mercury switch support 356—see the clips—and mounted therein is the mercury switch 357. When the parts are as shown in the full line position in Fig. 8, the arm 355 is constrained by gravity to the full line position. In that position the mercury switch is so arranged the mercury does not close the circuit through the terminals of said switches, which are connected to the wire 358. Thus, the main circuit is held open when the hand crank 280 is in position for manual operation of the power shaft. When the hand crank is positioned in the dotted line position, as shown in Fig. 8, the gear 284 moves to the dotted line position and in so doing, engages the arm 355 of the lever member 352 and tilts said lever member and holds said lever member in the tilted dotted position.

In this tilted dotted position, the mercury in said mercury switch bridges the terminals therein and completes the circuit so that when the hand crank is in the inoperable position—that is, depending, see dotted lines in Fig. 8—this main control circuit switch is in the closed circuit position.

The previously mentioned safety main switch connected to the manual selector shaft and operable thereby may be in series with this switch 357 and the several individual push button control switches. The several travel limit switches also are in series therewith.

As shown clearly in Fig. 8, the hand crank may be rotated and then tilted upon its pivot 280 so the handle portion lies underneath the casting portion 205a, see Fig. 16, and thus does not constitute an obstruction on the exterior or at the side of the bed.

It will be quite obvious from the foregoing, that inasmuch as the various pins 257, 258, 259 and 260 carried by the shaft 256 can only engage the clutch shifting lever mechanism, one at a time, that is but one operation can be obtained manually at ony one time.

It will be also observed that if it is desired, when the device is power operable, a single power operation may be effected or a plurality of power operations may be effected. For example, if the knee section 622 be elevated and the foot section 624 be slightly lower or horizontal, and the back section 619 be slightly elevated, the appropriate push buttons may be energized so that the bed pan support 715, see Fig. 16, may be elevated and the back elevated, or the foot section and knee section both may be lowered simultaneously.

Due to the fact that the power shaft 209 is reversely rotatable and but a single clutch is associated therewith for connecting the adjacent worm for rotation by said shaft, see Fig. 4, two opposed operations, of course, cannot be effected, since it is obvious that a single shaft 209 cannot rotate in two opposed directions at the same time.

As a further matter of safety, it is to be observed that preferably the safety switch 357 is connected in series with the safety switch 309 and thus both safety switches are in series with the main electrical supply to the motor 403 and the control push button station device must be conditioned for closed circuit position before any power operation can be obtained. Each push button station is of multiple switch character so that the motor is energized whenever anyone of the solenoids is energized and the direction of rotation is selectively controlled by the "up" or "down" push button for that particular mechanism sought to be operated.

Retention of switch closure or push button depression beyond that required for full range operation is ineffective for shaft rotation by the motor 403 because of the limit switch respectively in series with the clutch controlling solenoids.

The resulting modification of the basic invention herein disclosed, therefore, is capable of manual or power operation and in either event is directly or manual remotely controlled and is provided with all factors of safety essential to prevent over-driving or manual and power operation interference.

Reference now will be had to Figs. 16 to 19 for a better understanding of a form of an articulated bed structure which includes the structure illustrated in Figs. 4 to 10, inclusive, and previously described in detail.

In Figs. 16 to 19, inclusive, an articulated bed is illustrated which embodies a form of the invention and these figures all illustrate more particularly an articulated bed to which any embodiment of the invention herein disclosed may be applied in lieu of that specifically illustrated in said figures. Herein the back section 619 is pivoted at 620 to the side frames at the rear end of stationary section 623. Forward thereof at 621 is pivoted knee section 622 pivoted to leg section 624 at 625. The motor 403 is the power source.

A rod 675 connects the side portions of section 624 together. Each side rail mounts a track 666 upon which rides a roller 667 mounted in the free end of arm 668 fixed to cross shaft 669 pivoted in the side frame member.

Each of the aforesaid sections includes parallel metal strap 626 connected at opposite ends by springs 627 to the section frame. The stationary section includes a cutout portion to nest a mattress plug 644 or bed pan support 705, see Fig. 16. Shaft 203 operates the interchangeable support mechanism.

The pivoted end of the head section includes counterbalance cross member 643 terminating in an angular arm 645 offset at 646 to clear frame cross member 617 adjacent thereto. A link 648 connects at one end as at 647 to arm 645 and at the other end as at 649 to arm 202 rigid with a power shaft 222.

The frame 611 includes sockets 612 which receive pintle portions of legs 614 terminating in offset sockets 615 which receive pintles of the swivelling casters 616. Members 614 are secured by thumb-screws 613. When the sections are positioned as shown in Fig. 18 and the legs are turned inwardly, the bed can readily be passed through any standard door opening.

Depending from each end of brace 643 is an arm 642 mounting roller 651. An arm 653 has a slot 652 therein arcuate in character and terminating at 652a in a cam portion. Each arm 653, is pivoted on the adjacent side frame approximately in line with a shaft 224 hereinafter referred to. The other ends of arms 653 are connected by shaft 661 which pivots therein. A pair of arms 659 are rigid with shaft 661 and each terminates in a roller 658 slidable in slot 657 in member or plate 656 depending from the side frame of knee section 622.

An arm 660 is also rigid with shaft 661 and is connected at 655 to a link 662 connected at 663 to arm 200 rigid with reversible shaft 224, before mentioned.

When shaft 222 is actuated to move back section 619 from the horizontal position—see Fig. 19—toward the position shown in Fig. 18, the initial movement of said section tilts levers 653 on their pivots which thereupon tilts the equivalent bell cranks (two arms 659, one arm 660 and shaft 661) so that the knee section 622 automatically elevates with back section initial elevation. When rollers 651 enter the arcuate portions 652a of the slots 652 no further knee section movement occurs regardless of the additional amount of back section movement.

In a sense shaft 661 pivoted on the ends of arm 653 constitutes a floating or adjustable pivot. Whenever no back section movement occurs, and shaft 224 is actuated, it through link 662 and arm 660, rocks shaft 661 and arms 659 thereby causing independent movement of the knee section 622 regardless of back section position.

The foot section 624 bears on rollers 667 carried by arms 668 connected as at 675a and fixed to a cross shaft 669 pivoted in the side frame members. Arm 670 rigid with said shafts is pivoted at 671 to link 672 in turn pivoted at 673 to arm 201 rigid with reversible shaft 223.

When shaft 223 is reversely rotated, the foot section 624 is raised or lowered pivoting at 625 as desired; and independently of any other movable section. Inasmuch as section 624 is pivoted at 625 to knee section 622 and bears on rollers 667, it is obvious whenever the knee section is moved, the foot section will have conjoint movement and this is true whether the knee section be independently actuated from shaft 224 or remotely by way of the back section 619 as described.

The shaft 203 is associated with the conjointly operable mechanism for selectively associating the mattress plug 644 or bed pan support 705 by the several means illustrated in the lower central portion of Fig. 16. Since for an understanding of the present invention, the specific details of such means is believed unnecessary, reference, accordingly, is made to copending application Serial No. 323,677, now Patent No. 2,308,592, dated Jan. 19, 1943, before mentioned.

Referring to Figs. 16 and 18 note that side frames 610 and 611 are connected together by rods 617—618. Frame member 611 mounts or includes housing base 204 having cover 205 and projecting therefrom is handwheel 290 and crankshaft ears 179 with crank 281 pivoted thereto. Interiorly of the skeleton frame work there is supported reversible motor 403 having selective and reversible driving connection with the several shafts 224, 223, 222 and 221-203, all substantially vertically aligned as shown in Fig. 18, and projecting from housing 204-205 and frame 611. Note a bearing on frame 204 supports shaft 222, bearing 634 supports shaft 203 and bearing 636 supports shaft 223, see Figs. 5 and 16.

In Fig. 11 is diagrammatically illustrated a wiring arrangement suitable for the embodiment of the invention specifically disclosed in Figs. 4 to 10, inclusive.

Similar numerals employed in these figures are employed in Fig. 11 to indicate the same parts or devices.

In Fig. 11 the numeral 400 indicates an outlet plug having connected thereto current supply lines 401 and 402. In line 401 may be included safety switch 309. In line 402 there may be included safety switch 356. Both may be included in either line since the result is the same, to-wit, only when both switches are closed can the electric embodiment of the invention be utilized.

The reversible motor 403 is of conventional character. Herein, it is illustrated as a split phase motor with winding 405—404 and 406—406. Line 407 connects line 401 to windings 405. Line 408 connects one terminal of each solenoid 316 to 319, inclusive, to line 401.

Push button switches 409 to 412, inclusive, each is in series with the travel limit switch 241, 243, 245 or 247, respectively, and in series with solenoids 316 to 319, inclusive, respectively, as shown.

In parallel with said switches are the push button switches 413 to 416, inclusive, in series, respectively, with travel limit switches 233, 244, 246 and 248, respectively.

A common connection 417 is connected to one terminal of all push button switches and to line 418 connected to line 402.

The push button station is indicated by dash lines 419 and included therein are two other sets of switches, each set being operable by and in the operation of any corresponding push button switch of those previously mentioned.

Herein these supplementary switches required for motor operation and necessary to obtain the desired direction of motor rotation, are designated by numerals 420—421 and 422 for the "down" set and 423—424 and 425 for this "up" set.

Whenever any one of switches 409 to 412, inclusive, is closed, all switches 420 to 422 are simultaneously closed therewith. Similarly, whenever anyone of switches 413 to 416 is closed, all switches 423 to 425 are simultaneously closed therewith.

Terminals 425a and 422a are connected by line 426 which also connects to winding 406. Terminals 422b and 424b are connected by line 427. Terminals 424a and 421a are connected by line 428 which also connects to winding 406. Line 427 also connects winding 405 to terminals 422b and 424b. Line 429 connects terminals 423b and 420b and connects also to lines 417—418, as shown. Line 430 connects terminal 425b to line 431 connected to winding 405. Line 432 connects line 431 to terminal 421b and line 433 not only connects to line 431 as shown, but also connects to terminals 423a and 420a.

When these switches 420 to 425 are thus connected, depression of any one of switches 409 to 412 will close all switches 420 to 422 and the motor will be energized and rotate in one direction until either the closed switch 409 to 412 is released from depression or the associated travel limit switch 241, 243, 245 or 247, respectively, is operated mechanically, as previously described, which stops motor rotation of the clutch connected shaft. Switches 423 to 425 during this operation are locked out.

Similarly, depression of any one of switches 413 to 416 closes all switches 423 to 425, locks out switches 420 to 422, and current is supplied to motor 403 so that the same is reversely rotated for selective shaft operation until the selected push button is released, or if not released, until the associated limit switch 233, 244, 246 or 248, respectively, is actuated to open the clutch solenoid circuit.

Release of the push button stops motor operation as well as solenoid operation whereas limit switch operation only deenergizes the associated clutch controlling solenoid so that the device is conditioned for subsequent operation, while the motor may continue to run.

Caution: The switches should not be closed to obtain different motor rotations. All switches for either "up" or "down" operation may be closed, however, and for that reason the clutch control solenoid is controlled by its associated travel limit switches so that if one selected shaft operation is completed before another, the motor will continue operation although the clutch controlled mechanism (selected shaft) for which the solenoid has been deenergized does not continue to operate. A suitable interlock arrangement will be described hereinafter to prevent simultaneous "up" and "down" switch closing.

This brief explanation and description of the actions, connections, et cetera, of the parts indicated in Fig. 11, together with the previous description, is believed sufficient so that a complete understanding of this second form of the invention may be had from that disclosed herein.

In Fig. 12 there is illustrated a wiring diagram similar to that shown in Fig. 11 and the major portion of the aforesaid description of Fig. 11 applies to Fig. 12.

In Fig. 12, the same numerals are applied to the same or similar parts. This figure illustrates the so-called remote control form of the invention. Numerals of the 500 series indicate additions.

Insofar as the motor reversal is concerned, it is to be observed that the members 423—424—425 are bridging contacts carried by an insulated member 500 which is subject to the action of a solenoid 501 in turn having one terminal connected by line 502 to the line 418. The other terminal is connected to line 503 to which reference will be had more fully hereinafter.

When solenoid 501 is energized, member 500 is elevated, thereby closing the several switches 425—425a—425b, 424—424a—424b and 423—423a—423b. In like manner, the bridging contacts 420—421—422 are insulatably connected together and supported by the member 504 responsive to the solenoid or relay 506 having one terminal connected by line 507 to supply line 418. The other terminal of the solenoid or relay 506 is connected to the line 508. Herein each of the members 409 to 416, inclusive, are represented as bridging contacts and each is carried by a member having the same numeral with the subscript $a$ and this member in turn is responsive to a solenoid or relay having the same number with the subscript $b$. When the appropriate solenoid is energized, the bridging contact responsive thereto closes the circuit across the two similarly numbered contacts having the subscripts $c$ and $d$. Each of the eight solenoids is connected to the line 417, being a continuation of the line 418. Each of the contacts having the subscript $d$ is similarly connected. The line 408 being a main power supply line is connected to each of the clutch controlling solenoids 316 to 319, inclusive, as shown.

The switch station or box is indicated in Fig. 12 by the numeral 519 and mounted thereon are eight push buttons, designed by the numerals 509, 510, 511, 512, 513, 514, 515 and 516. Each of these push buttons is arranged so that the movable contact member thereof, designated by the appropriate subscript $a$ is adapted to simultaneously contact three stationary contacts, designated by the subscripts $b$, $c$, and $d$.

By referring to solenoid 412b, it will be noted that the line 512e connects to the other terminal of that solenoid at one end and at its opposite end connects to the contact 512d. In like manner, the several solenoids 409 to 416, inclusive, with the subscript $b$ are connected to the several switch points 509 to 516 with the subscript $d$ by the several lines having the same numbers but with the subscripts $e$.

All of the switch points 509 to 512, inclusive, with the subscripts $c$ are connected together by the line 520 in turn connecting by the line 508 to the solenoid 506. In like manner, all of the switch points 513 to 615, inclusive, with the subscripts $c$ are connected together by the line 521 in turn connected by line 503 to the solenoid 501. All of the switch points 509 to 516 with the subscript $b$ are connected together and to the line 522 which is an extension of the line 408.

Depression of any one of the push buttons 509 to 512, inclusive, thus will provide a closed circuit through line 418 to the "down" solenoid 506 and from the solenoid 506 by line 508 to the solenoid 522 and thence to the main 408. In like manner, depression of any one of the "up" buttons 513 to 516, inclusive, will similarly energize the "up" solenoid 501. At the same time that either of these two solenoids is energized, the companion and corresponding one of four relays or solenoids is energized by the appropriate switch member having the subscript $a$ supplying current through the switch point having the subscript $d$ to the solenoid or relay of the 400 series, having the subscript $b$. The circuit through one solenoid is as follows:

Line 418, line 417, solenoid 412b, line 512e, contact 512d bridging member 512a, contact 512b, line 522, and line 408. In like manner, each of the other eight solenoids may be individually energized.

When a relay or solenoid 409 to 416, inclusive, with the subscript $b$, is energized, the bridging switch contact having the corresponding numeral without the subscript, is elevated to bridge the contacts having the same numeral but having the subscripts $a$ and $c$ and thus the main power circuit is closed through the corresponding solenoid 316 to 319, inclusive.

It will be noted that either solenoid 412b or 416b closes the circuit through solenoid 319, either solenoid 411b or 415b closes the circuit through solenoid 318, either solenoid 410b or solenoid 414b closes the circuit through solenoid 317 or either solenoid 409b or solenoid 413b closes the circuit through solenoid 316.

It will thus be apparent that the several switches 412 to 416, inclusive, and the motor reversing switch together with the motor reversing switch control solenoids 501 and 506 together with the several solenoids or relays 412 to 416, inclusive, with the subscript $b$, all may be mounted on the frame of the bed structure and enclosed, if desired, within the cabinet or housing arrangement and only the several lines 522, 503, 508, and 509c to 516c, inclusive, need be extended therefrom to the push button arrangement 519. Thus, these last mentioned lines may be #14 wire, or smaller, while all of the other lines may be #8 wire, or the like. Thus, the push button station connecting lines are of fine wire and comprise a relatively small and flexible cable structure.

It is also to be observed that the several solenoids 501 and 506 and 409b and 417b, need not necessarily be line voltage solenoids or relays but may be of lower voltage and if they are of lower voltage, it will be quite apparent that all that is required is to interpose between lines 418 and 408 the primary of a transformer and the secondary thereof then would be suitably connected to the several push buttons and the several solenoids or relays as is well understood in the electric control art, so for simplicity, illustration of this modification is intentionally omitted.

To protect the system against accidental or intentional but undesirable simultaneous actuation of a "down" button as well as an "up" button, there is provided an interlock arrangement. Herein same is illustrated as of mechanical type and more particularly applied to the form of the invention illustrated in Fig. 12. Wherefore, in Figs. 13 to 15 numerals are employed identical to those used in Fig. 12 for designating like parts.

For simplicity, the insulation or molded housing and cover plate, together with insulation extensions of the switch members which are exposed, are intentionally omitted; hence, only the skeleton frame work and interlock of the push button station 519 is illustrated.

In said Figs. 13 to 15, the numeral 600 indicates a pair of confronting spaced angle members which mount insulation plates 60, adjacent which are the several groups of three contacts included within the station 519 in Fig. 12. The bridging contact for each group is illustrated as of V-type in Fig. 14 and each is mounted on an insulation plate 603 carried by the switch actuating member.

The angle members are connected together at opposite ends by members 604 which connect to base plate 605, apertured at 606 for casing mounting. Interposed between the angle plate 600 and shoulder 607 on each switch actuating member, is spring 608 normally constraining the switch to open circuit position.

Each of said switch actuating members is notched as at 609, the same when the member is in open circuit position being positioned above plate 605. An interlock plate 610 is slidably supported at 611 upon plate 605. Its opposite edges are notched as at 612, the positioning of said notches corresponding to the positioning of the switch actuating members.

As shown in Figs. 12 to 15, inclusive, these switch actuating members are arranged in two groups. Hence, when any switch actuating member is moved to closed circuit position, it forces the interlock plate toward one end or the other of plate 605. The notches on opposite sides are slightly offset. The width thereof is such, however, that if one switch actuating member be actuated, the plate even though moved will nevertheless permit closing of the other switches of that group.

Depression of any such member upon movement of the plate 610 causes the latter to seat in the notches 609 of all the members of the other group, thereby preventing actuation of any switch of that group until any and all of the switches of the group initially closed are returned to open circuit position.

In this movement, as a result of release of finger pressure from the actuating member and effectiveness of spring 608, the guard plate is automatically returned to neutral position.

Then and then only can a switch of the other group be closed and upon such actuation, the closing of any switches of the first mentioned group is prevented.

While the invention has been illustrated and described in great detail in the drawings and foregoing description, the same is to be considered as illustrative, and not restrictive in character.

The several modifications described herein as well as others which will readily suggest themselves to persons skilled in this art, all are considered to be within the broad scope of the invention, reference being had to the appended claims.

The invention claimed is:

1. In an articulated bed structure having a plurality of hingedly mounted mattress supporting bed forming sections, a frame supporting same, the combination of means for individually moving certain of the sections, a single vertically disposed reversible power shaft carried by the frame and to one side and externally thereof, a horizontally disposed reversible electric motor for reversibly rotating said shaft and disposed within and supported by the frame, a worm and wheel connection between the horizontally disposed motor and the vertically disposed shaft reversible, rotatable means extending through the frame and operatively connected at the frame included ends to the individual moving means, means selectively connecting the other ends of each of said reversibly rotatable means to said shaft, and means controlling the rotation of said motor and the connection of the selective connecting means for desired bed section movement.

2. An articulated bed structure as defined by claim 1 wherein the last-mentioned means comprises a motor reversing switch and selective clutch control switches, manually operable members for the latter, and circuit means controlled by said members and switches for motor operation in the direction and to the extent desired for section movement in the direction and to the extent desired.

CHARLES DREXLER.
RALPH H. MORGAN.